United States Patent [19]
Oda et al.

[11] Patent Number: 4,459,464
[45] Date of Patent: Jul. 10, 1984

[54] ELECTRIC CIGAR LIGHTER

[75] Inventors: Akira Oda; Takashi Ozaki; Masahiko Kato; Kunio Kato; Teiji Kanamori, all of Nagoya, Japan

[73] Assignee: Kabushiki Kaisha Tokai Rika Denki Seisakusho, Aichi, Japan

[21] Appl. No.: 425,253

[22] Filed: Sep. 28, 1982

[30] Foreign Application Priority Data

Oct. 13, 1981 [JP] Japan .......................... 56-152420[U]
Oct. 14, 1981 [JP] Japan .......................... 56-153196[U]

[51] Int. Cl.³ .............................................. F23G 7/24
[52] U.S. Cl. .................................. 219/264; 219/265; 219/517; 337/6; 337/296
[58] Field of Search ............... 219/253, 262, 263, 264, 219/265, 266, 517; 337/6, 290, 295, 296, 297, 414, 415

[56] References Cited

U.S. PATENT DOCUMENTS

| | | | |
|---|---|---|---|
| 1,660,828 | 2/1928 | Bird | 337/296 |
| 2,018,558 | 10/1935 | Hope | 337/296 |
| 2,168,815 | 8/1939 | Wood | 219/517 X |
| 3,168,632 | 2/1965 | Baran et al. | 337/296 X |
| 3,201,646 | 8/1965 | Mansfield et al. | 337/296 X |
| 3,573,428 | 4/1971 | Denning et al. | 219/265 |
| 3,641,469 | 2/1972 | Pramaggiore | 337/404 |
| 4,016,400 | 4/1977 | Seibel et al. | 219/264 |

Primary Examiner—Volodymyr Y. Mayewsky
Attorney, Agent, or Firm—Jackson, Jones & Price

[57] ABSTRACT

The present disclosure relates to an electric cigar lighter for use, for example in vehicles, having a circuit breaker. The circuit breaker includes an elongated fuse member having a fuse and a tube for covering the fuse. The tube has a melting point slightly lower than that of the fuse. Therefore, when the fuse melts and separates in two parts upon overheating of a heating element carried by an igniting of the lighter, the separated ends of the fuse are wrapped by the separated ends of the tube. Thus, even if the separated ends of the fuse member contact some portions of the lighter placed adjacent to the fuse member or other members, a short circuit can be prevented.

15 Claims, 13 Drawing Figures

ELECTRIC CIGAR LIGHTER

BACKGROUND OF THE INVENTION

The present invention relates generally to electric cigar lighters for use in vehicles or the like, and more particularly to certain improvements of a circuit breaker employed in the lighters of this type which are automatic in their operation with a removable igniting unit which is manually moved to its closed-circuit position and automatically returned to its open-circuit position after a heating element carried by the unit has been brought into a red hot state.

Conventionally, there is provided a fuse as a circuit breaker which is formed of solder and incorporated in the electric circuit of the lighter so as to open the circuit to the heating element of the lighter upon either overheating thereof or upon a short-circuit or overload in the circuit.

The fuse as the circuit breaker as described above has such a disadvantage that when it melts at its middle portion and separates in two parts due to the overheating of the heating element and the like to open the circuit, one of the separated ends thereof may accidentally contact some portion of members mounted in the lighter or the other device arranged adjacent to the fuse to cause a short circuit.

SUMMARY OF THE INVENTION

It is therefore a essential object of the present invention to provide an electric cigar lighter having an improved circuit breaker which is adapted to prevent any short circuit when it opens the circuit of the electric cigar lighter due to overheating thereof.

A further object of the present invention is to provide an electric cigar lighter having such a circuit breaker of the above type which is simple in construction and accurate in functioning with high reliability, and can be readily manufactured at low cost for incorporation into various lighters.

In accomplishing these and other objects, according to the present invention, there is provided, an electric cigar lighter for use, for example in vehicles, having a circuit breaker which includes an elongated fuse member. The fuse member has a fuse and a tube for covering the fuse. The tube has a melting point slightly lower than that of the fuse. Therefore, when the fuse melts and separates in two parts upon overheating of a heating element carried by an igniting plug of the lighter, the separated ends of the fuse are wrapped by the separated ends of the tube. Thus, even if the separated ends of the fuse member contact some portions of the lighter placed adjacent to the fuse member or other member, a short circuit can be prevented.

BRIEF DESCRIPTION OF THE DRAWINGS

These and other objects and features of the present invention will become apparent from the following description taken in conjunction with the preferred embodiments thereof with reference to the accompanying drawings, in which.

Before the description of the present invention proceeds, it is to be noted that like parts are designated by like reference numerals and symbols throughout several views of the accompanying drawings.

DETAILED DESCRIPTION OF THE INVENTION

Figure 1:
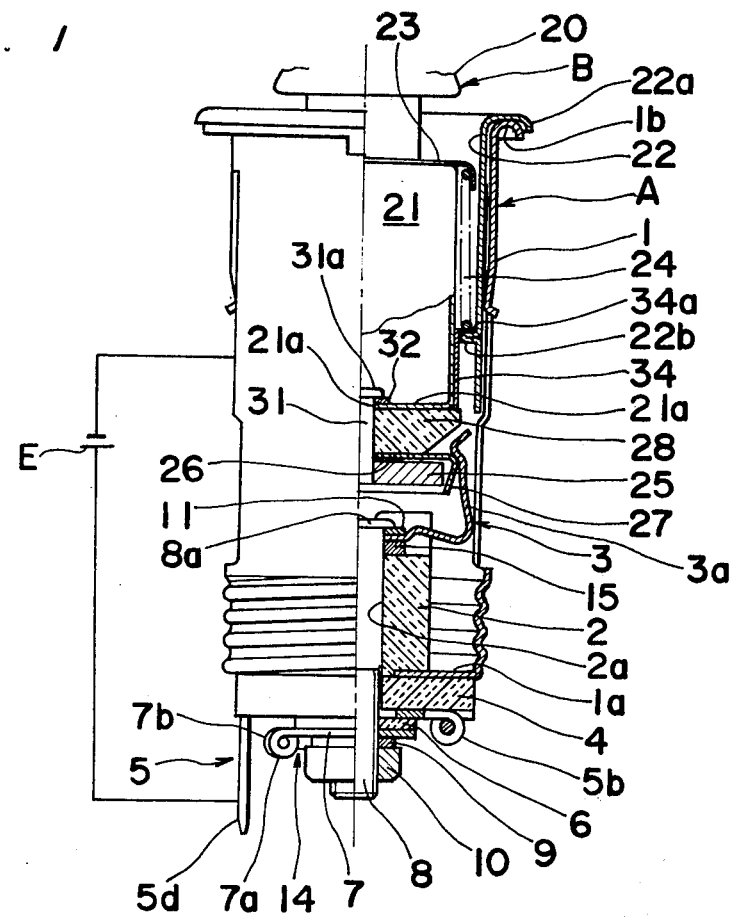
FIG. 1 is a front elevational view, partly sectioned, of an electric cigar lighter according to one preferred embodiment of the present invention.

Referring to FIG. 1, the lighter according to the present invention comprises a socket A and, an igniting unit or removable plug B adapted to be detachably mounted in the socket A.

The socket A includes an electrically conductive tubular case or holder 1 having at its front end, a flange 1b adapted to engage the front face of an instrument panel or other support (not shown) having an opening.

Figure 3:
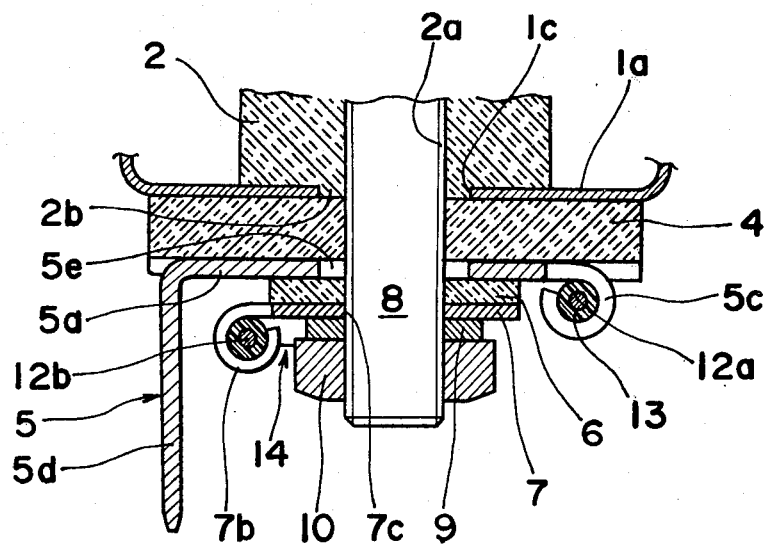
FIG. 3 is a fragmentary enlarged sectional view of the lower part of the lighter shown in FIG. 1.

As shown in FIGS. 1 and 3, an insulating spacer 2 is mounted on the bottom end wall 1a of the holder 1 such that a central bottom projection 2b thereof is inserted in the central opening 1c formed in the bottom end wall 1a. A terminal screw 8 is inserted in a hollow 2a of the insulating spacer 2. The terminal screw 8 has, at the front end thereof, a head portion 8a which clamps a bimetallic latch 3 against the upper face of the insulating spacer 2 in the manner that the central portion of the latch 3 is sandwiched by electrically conductive washers 11 and 15 between the head portion 8a and the upper face of the insulating spacer 2.

The rear end of the terminal screw 8 projects downwardly from the hollow 2a of the insulating spacer 2. The projected end of the terminal screw 8 receives an insulating spacer 4, a terminal plate 5 or fuse holder, an insulating washer 6, an electrically conductive fuse holder 7, a spring washer 9 and a tying nut 10 which are provided in the form of a layer.

The terminal plate 5 is of an L-shape comprising a horizontal portion 5a and a vertical portion 5d. The vertical portion 5d is connected with the anode of a power source E, while the horizontal portion 5a has an opening 5e, through which the terminal screw 8 passes without contacting thereto, and a pair of circularly bent lug portions 5b and 5c at the end thereof remote from the vertical portion 5d. The fuse holder 7 has an opening 7c, through which the terminal screw 8 passes while contacting thereto, and a pair of circularly bent lug portions 7a and 7b at one end thereof remote from the bent lug portions 5b and 5c of the terminal plate 5.

Figure 2:
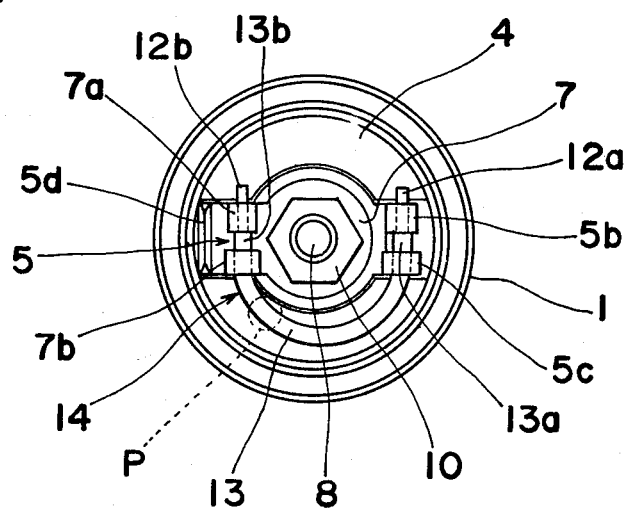
FIG. 2 is a bottom view of the lighter shown in FIG. 1.
Figure 4:
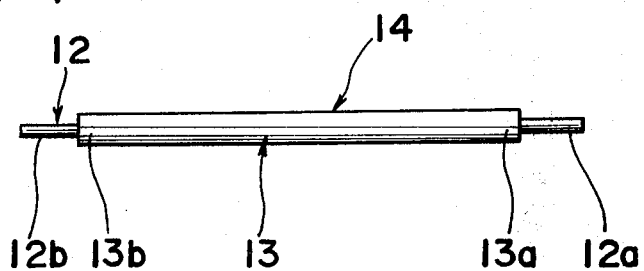
FIG. 4 is a front elevational view of a fuse member extended in a linearly mode and forming the circuit breaker which is incorporated in the lighter shown in FIG. 1.

There is shown in FIG. 4 a fuse member 14 which is used for connecting to each other, the terminal plate 5 and the fuse holder 7 and which comprises an elongated fuse 12 in a form of a wire and insulating tube 13 for tightly covering the fuse 12 except for the opposite ends thereof 12a and 12b. As shown in FIG. 2, the fuse member 14 is bent into a U-shape and one end thereof is held by the portions 5b and 5c of the terminal plate, while the other end is held by the portions 7a and 7b of the fuse holder. The portion 5b holds one end 12a of the fuse, while the other portion 5c holds one end 13a of the tube. Furthermore, the portion 7a holds the opposite end 12b of the fuse, while the other portion 7b holds the opposite end 13b of the tube, and thus, the terminal plate 5 is electrically connected to the terminal screw 8 through fuse member 14 and fuse holder 7.

The fuse 12 of the fuse member 14 may be formed of, for example solder comprising tin (Sn) and lead (Pb) or tin, lead and cadmium (Cd), or an alloy comprising tin and zinc (Zn). While, the tube 13 is formed of a synthetic resin, such as polyethylene, which has the melting point lower than that of a fuse 12 preferably by substantially 30° C.

The removable plug B is provided with a usual heating element 25 at its inner or rear end, which comprises a coil of resistance wire that is welded, at one end, to a rivet 31 and, at its other end, to a metal cap or ferrule 27 which is secured to the rivet 31 through insulation from the rivet 31 by a insulating spacer 28 surrounding the rivet 31 between the ferrule 27 and a plug body 21. The front end of the rivet 31 projects into the plug body 21 through an opening 21a formed in a bottom wall 21a and has a head 31a. An electrically conductive washer 32 is interposed between the head 31a and the bottom wall 21a.

An operating knob 20 is adapted to be secured to the front end of the plug body 21 in any convenient manner. As shown herein, the body 21 is provided with an end cap 23 at its front face and outer sleeve 22. The sleeve 22 has at its front end, a flange 22a extending outwardly to detachably engage the flange 1b of the holder 1, and at the middle portion thereof another flange 22b extending inwardly to fixedly receive a flange portion 34a of an inner sleeve 34, inner face of which slidably contacts the outer face of the plug body 21. A coil spring 24 is interposed between the body 1 and the outer sleeve 22, and received at upper end thereof, by the peripheral portion of the end cap 23 and at its lower end, by the upper portion of the flange 34a of the inner sleeve 34 or the flange 22b of the sleeve 22 so that the body 21 can move in the direction of its axis with respect to the outer sleeve 22 and against the compression of the spring 24. The rear end of the inner sleeve 34 is in contact with the upper face of the insulating spacer 28 so that the outer sleeve 22 can be moved together with the body 21 when the operating knob 20 is forwardly pulled from the socket A.

When it is desired to use the lighter, the plug B is manually pushed rearwardly within the socket A to the closed-circuit position which is shown in FIG. 1. During this movement of the plug B, the flange 22a of the sleeve engages the flange 1b of the holder 1, and thus the end cap 23 is moved rearwardly to compress the spring 24, and the ferrule 27 engages the bent ends of the resilient latch fingers 3a.

It will be understood by those skilled in this art that the bimetallic latch fingers 3a are adapted to gradually expand or move outwardly as they are heated by heat from the heating coil 25 during energization thereof and the resiliency and rate of movement of these fingers is such that they will grip and retain the ferrule 27 against return movement by the ejecting spring 24 until the heating coil has attained some predetermined temperature at which the spring 24 will overcome the friction between the ferrule and fingers and return the plug to the open-circuit or storage position from which it may be withdrawn for use.

Although the circuit for the heating element should be obvious from the illustration in FIG. 1, it should be noted that, during the energization thereof, the current is conducted from the terminal plate 5, which is connected to a source of the current E as previously described, through the fuse member 14, fuse holder 7, terminal screw 8, bimetallic latch 3 and ferrule 27 to the outer end of the heating coil 25, and from the inner end of this coil through the rivet 31, plug body 21, inner sleeve 34 and outer sleeve 22 to the holder 1 which is grounded.

Figure 5:
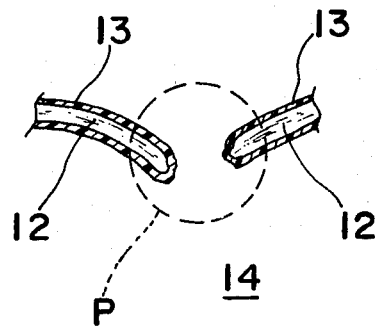
FIG. 5 is a sectional view of the fuse member which has melted and separated in two parts.

During the energization for igniting the heating element 25, when this heating element is overheated due to some accident such as a wrong operation so that the temperature of the fuse member 14 increases up to the melting point, the covering tube 13 of the fuse member 14 first melts and subsequently the fuse 12 melts, and therefore the fuse member 14 separates in two parts as shown in FIG. 5. It is to be noted that the separation of the fuse member is effected in several seconds, and during the separation, the melted ends of the tube 13 rapidly shrinks and wraps the melted ends of the fuse 12. It is to be also noted that the fuse member 14 has a tendency to separate at a portion, designated by P in FIG. 2, which is adjacent to the bent lug portion 7b of the fuse holder and remote one end 12b of the fuse. This is because the heat from the heating element 25 is conducted through terminal screw 8 and fuse holder 7 to the fuse member 14, and therefore the temperature of one end portion, i.e. the end 12b of the fuse and the end 13b of the tube, increases first rather than that of the other end of the fuse member 14. The fuse member 14 does not separate at the end 12b of the fuse and the end 13b of the tube because these ends are held by bent portions 7a and 7b of the fuse holder. Accordingly, even if the separated ends of the fuse member 14 contact some portions of the lighter or the other member disposed adjacent to the fuse member 14, no short circuit would be caused.

Figure 6:
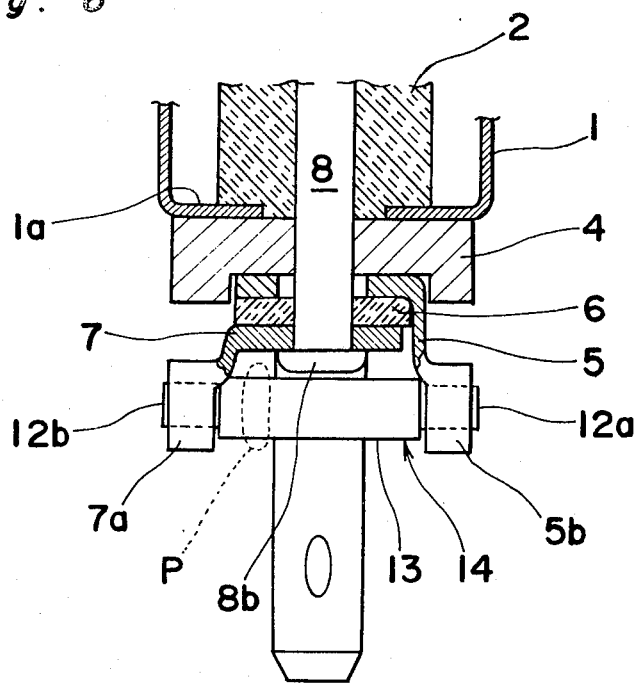
FIG. 6 is a view similar to FIG. 3 showing a modification of the present invention.
Figure 7:
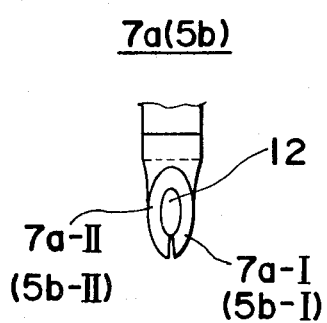
FIG. 7 is a partial side elevational view of the lighter in FIG. 6.

Referring now to a modification shown in FIG. 6, the insulating spacer 4, terminal plate 5 and fuse holder 7 are held to the plug body 1 by the lower head 8b of the terminal screw 8. The terminal plate 5 has at its periphery a fuse holding portion or bent portion 5b for holding one end 12a of the fuse of the fuse member, while the fuse holder 7 has a bent portion 7a, similar to the bent portion 5b of the terminal plate, for holding the other end 12b of the fuse, which bent portion 7a is so arranged as to face the bent portion 5b of the terminal plate. The bent portion 7a and 5b respectively comprises a pair of bent lugs 7a-I and 7a-II; 5b-I and 5b-II, and the fuse member 14 extends straightly across the diameter of the plug body 1 such that the opposite ends 12a and 12b of the fuse are respectively clamped by the corresponding bent lugs as shown in FIG. 7.

In the construction of the modification as above described, upon overheating of the heating element the fuse member 14 will melt and separate at a portion P adjacent to the bent lugs 7a.

Figure 8:
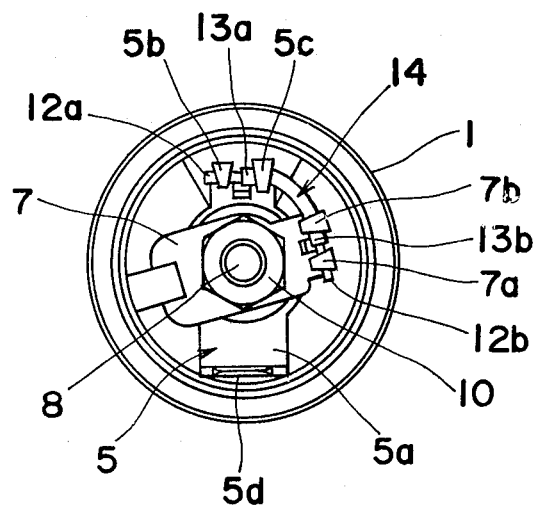
FIG. 8 is a view similar to FIG. 2 showing another modification of the present invention.

Furthermore, referring to another modification shown in FIG. 8, the terminal plate 5 and the fuse holder 7 are arranged relative to each other such that the bent portions 5b and 5c of the terminal plate and the bent portions 7a and 7b of the fuse holder are so positioned as to form an acute angle with respect to the center of the terminal screw 8, and therefore, the fuse member 14 is held in a manner of substantially L-shape by these bent lug portions.

Figure 9:
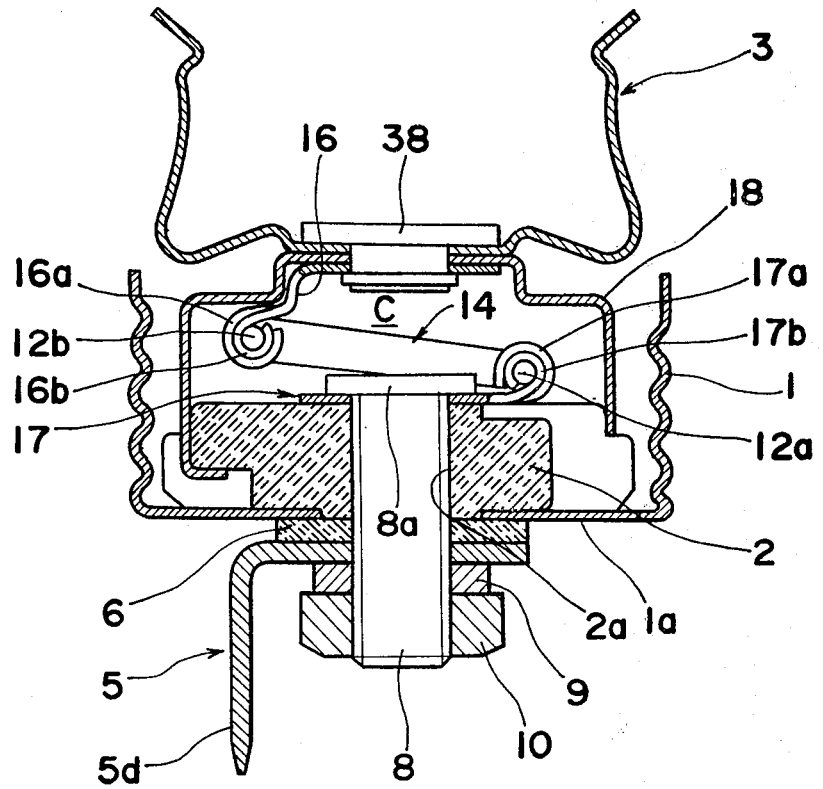
FIG. 9 is a view similar to FIG. 3 showing another embodiment of the present invention.

Referring to a second embodiment of the present invention shown in FIG. 9, a circuit breaker is incorporated in the holder 1 of the socket A. The bimetallic latch 3 is supported by a supporting member or a cage 18, the lower end of which is secured to the insulating spacer 2, while forming a cavity C between the upper face of the insulating spacer 2 and the upper wall of the cage 18. The bimetallic latch 3 is placed upon the upper wall of the cage 18 and is clamped by a rivet 38 to the above upper wall together with one fuse holder 16 which is attached on the lower face of the upper wall of the cage 18. The fuse holder 16, formed of electrically conductive material, has substantially the same construction as that of the fuse holder 7 illustrated in FIGS. 1 to 3. In other words, the fuse holder 16 has a pair of bent lug portions 16a and 16b at one end thereof.

In the meanwhile, the terminal screw 8 is downwardly inserted in an opening 2a of the insulating spacer 2 and downwardly projects from the bottom wall 1a of the holder 1. The downwardly projecting end of the terminal screw 8 receives the insulating washer 6, terminal plate 5, spring washer 9 and tying nut 10. In this embodiment, the terminal plate 5 is arranged so as to contact the terminal screw 8. In addition, another fuse holder 17 is clamped to the upper face of the insulating spacer 2 by the terminal screw 8 while being sandwiched by the upper face of the insulating spacer 2 and the head 8a of the terminal screw. The fuse holder 17 has substantially the same construction as that of the other fuse holder 16, as previously described, i.e. the fuse holder 17 has a pair of bent lug portions 17a and 17b which are placed at a position remote from the bent portions 16a and 16b with respect to the head 8a of the terminal screw.

Figure 10:
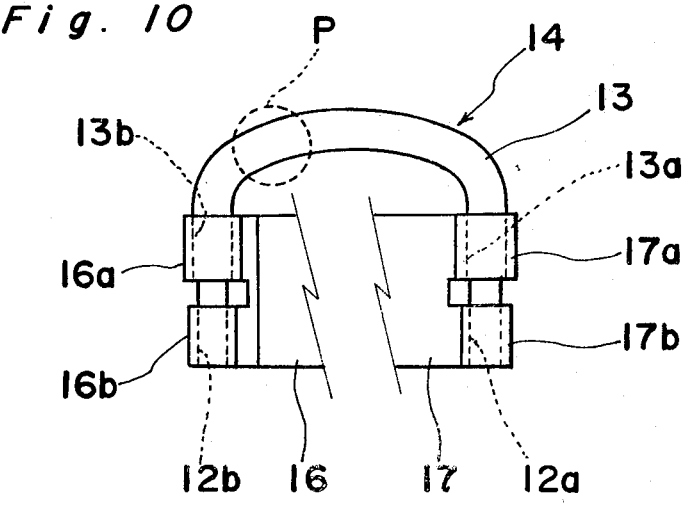
FIG. 10 is a view showing the construction for holding the opposite ends of the fuse member in FIG. 9.

As shown in FIG. 10, the fuse member 14 is bent into U-shape and one end 12a of the fuse 12 is clamped by the bent portion 17b of the fuse holder 17, while one end 13a of the tube 13 is clamped by the other bent portion 17a, and, furthermore, the other end 12b of the fuse is clamped by one bent portion 16b, while the other end of the fuse holder 16, the tube 13 is clamped by the other bent portion 16a.

In the construction of this embodiment, during the energization for the circuit, the current is conducted through the terminal plate 5, terminal screw 8, fuse holder 17, fuse member 14, fuse holder 16 and rivet 38 to the bimetallic latch 3, and as in the first embodiment, from the bimetallic latch 3 to heating element of the plug, not shown in FIG. 9. Upon overheating of the heating element, the fuse member 14 will melt and separate at one end portion thereof indicated at P which is placed at a position nearer to the heating element than the other end is.

Figure 11:
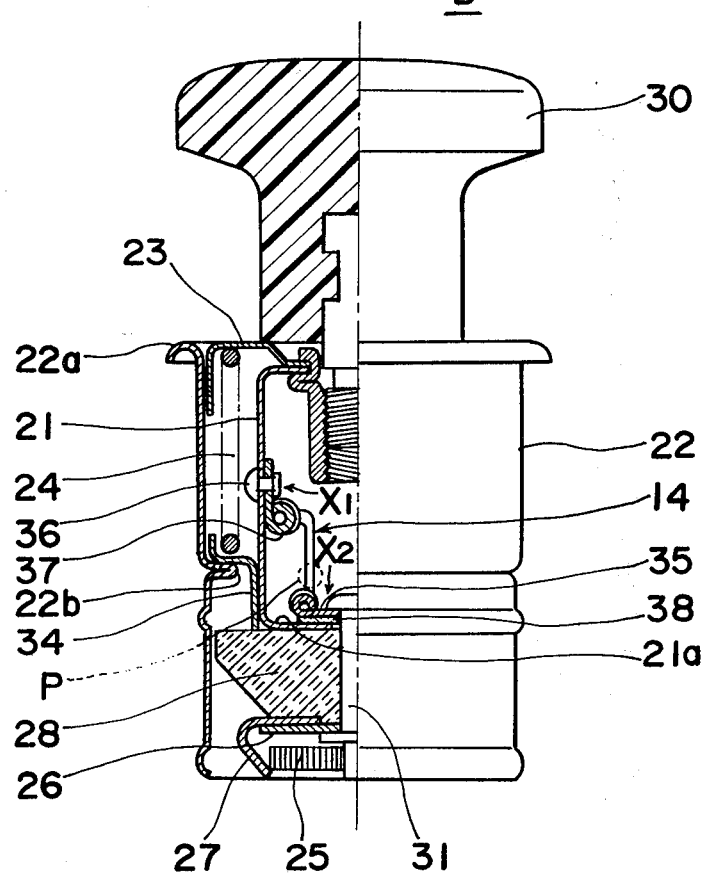
FIG. 11 is a front elevational view, partly sectioned, of an igniting unit according to a further embodiment of the present invention.
Figure 12:
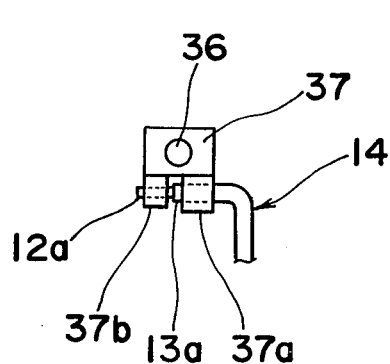
FIGS. 12 and 13 are respectively partial views of a fuse holder employed in the igniting unit in FIG. 11, viewed in the direction of arrows x1 and x2 in FIG. 11.
Figure 13:
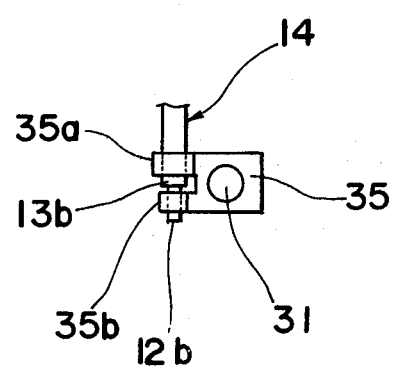

There is provided a third embodiment in FIGS. 11 to 13, in which the circuit breaker is incorporated in the removable plug B.

The construction of the plug B is substantially the same as that shown in FIG. 1, except the existence of the circuit breaker. Therefore, detailed description thereof is abbreviated here for brevity, with like parts being designated by like reference numerals.

The fuse member 14 is arranged in the plug body 21 and one end thereof is held by a fuse holder 37 which is secured to the side wall of the body 21 by a rivet 36, while the other end thereof is held by another fuse holder 35 which is secured to the bottom wall 21a of the body 21 by the rivet 31.

As shown in FIG. 12, the fuse holder 37 has a pair of bent lug portions 37a and 37b, while the other fuse holder 35 has a pair of bent lug portions 35a and 35b. Similarly as in the previously described first and second embodiments, one end 12a of the fuse 12 is clamped by the bent lug portion 37b, while the other end 12b is clamped by the bent lug portion 35b, and furthermore, one end 13a of the tube is clamped by the bent portion 37a, while the other end 13b is clamped by the other bent lug portion 35a.

In addition, in this embodiment, the rivet 31 is not in contact with the bottom wall 21a of the plug body 21, and a insulating washer 38 is interposed between the upper face of the bottom wall 21 and the fuse holder 35.

In the construction of this embodiment, during the energization of the circuit, the current is conducted from the heating element 25 through the rivet 31 and the fuse holder 35 to the fuse member 14, and from the fuse member 14 through the fuse holder 37, plug body 21, inner sleeve 34 and outer sleeve 22 to the holder of the socket (not shown) in FIG. 11. When the heating element 25 is overheated due to some accident, the fuse member 14 will melt and separate at one end portion P adjacent to the fuse holder 35 which is connected to the heating element 25 through the rivet 31.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. In an electric cigar lighter for use in vehicles and the like, which comprises a socket, and a movable igniting unit which is received in said socket and is manually moved to its closed-circuit position and automatically returned to an open-circuit position after a heating element carried by the unit has been brought to a red hot state, the improvement comprising an elongated fuse member adapted to be incorporated in a path of said closed-circuit, the fuse member including a fuse and an electrically insulating tube for covering said fuse, said tube having a melting point slightly lower than that of said fuse, whereby said fuse member melts and separates into two parts upon overheating of said heating element, the separated ends of said fuse being wrapped by separated ends of said tube and fuse holding means fixed on said socket and securing both ends of the fuse member to said socket.

2. An electric cigar lighter as claimed in claim 1, wherein said circuit breaker is incorporated in said igniting unit.

3. An electric cigar lighter as claimed in claim 2, wherein said igniting unit has an outer sleeve arranged to engage the socket holder upon being inserted into the socket holder, a plug body arranged in said outer sleeve so as to be movable in an axial direction thereof and carrying at its rear end, said heating element, a rivet for securing the heating element to said plug body and a pair of fuse holders, one of said fuse holders being secured to said plug body, with the other fuse holder being secured to said rivet, each of said fuse holders having a fuse holder portion for clamping one end of said fuse member.

4. In an electric lighter including a socket member adapted to being connected through an electrical circuit to a source of electrical power, a removable igniting unit that can be energized to a temperature to ignite cigarettes, cigars and the like and a circuit breaking device for limiting current to the lighter to prevent overheating, the improvement comprising:
- a first fusable member in the circuit breaking device for conducting electrical current and capable of melting and separating into discrete non-conducting parts at a predetermined temperature, and
- a second member of an electrically nonconductive material having a lower predetermined melting point than the first fusable member and operatively positioned to encompass respectively, the separated parts and to electrically isolate the same upon breaking of the circuit.

5. The invention of claim 4 wherein the second member surrounds the first member.

6. The invention of claim 5 wherein the second member is tubular.

7. The invention of claim 5 wherein the first and second members are elongated and have a combined rod-like configuration.

8. In an electric lighter for vehicles and the like including a socket member adapted to being connected through an electrical circuit to a source of electrical power, a removable igniting unit that can be energized to a temperature to ignite cigarettes, cigars and the like and a circuit breaking device for limiting current to the lighter to prevent overheating, the improvement comprising:
- a first fusable member in the circuit breaking device for conducting electrical current and capable of melting and separating into discrete parts at a predetermined temperature, and
- a second fusable member of an electrically nonconductive material operatively surrounding the first fusable member and having a predetermined melting point less than the first member whereby upon separation of the first fusable member into separate parts with open ends the circuit is opened and the second fusable member covers the respective fused ends of the first member and electrically isolates them.

9. An electric cigar lighter for use in vehicles and the like comprising:
- a socket having a tubular holder;
- a movable igniting unit having a heating element which can be positioned in said tubular holder and manually moved to a closed-circuit position and automatically returned to an open-circuit position after said heating element carried by the unit has reached a predetermined temperature;
- contact means in the interior of said tubular holder for detachable connection of said heating element to a source of power;
- a terminal plate mounted on the exterior of said tubular holder for connection to a source of power;
- a terminal rod means arranged to be inserted into an opening formed in a bottom wall of said tubular holder for securing together said contact means and said terminal plate to said bottom wall;
- a fuse holder secured to said terminal rod means at the exterior of said tubular holder while contacting said terminal rod means, but insulated from said terminal plate, said contact means being electrically connected to said terminal rod means;
- an elongated fuse member adapted to be incorporated in said closed-circuit, said fuse member further including a fuse and an electrically insulating tube for covering said fuse, said insulating tube having a melting point slightly lower than that of said fuse, whereby said fuse member melts and separates into two parts upon overheating of said heating element, the separated ends of said fuse being wrapped by separated ends of said insulating tube, said terminal plate being insulated from said terminal rod means and having a holder portion for holding one end portion of said fuse member, said fuse holder having a fuse holder portion for holding the opposite end portions of said fuse member.

10. An electric cigar lighter as claimed in claim 9, wherein each of said fuse holder portions of said terminal plate and said fuse holder have a bent portion for clamping one end of said fuse and a bent portion for clamping one end of said tube.

11. An electric cigar lighter as claimed in claim 10, wherein said fuse holder portions of the terminal plate and the fuse holder are arranged such that these fuse holders are placed at opposite sides with respect to the terminal rod means, and said fuse member is held by said fuse holders so as to be bent substantially into a U-shape.

12. An electric cigar lighter as claimed in claim 10, wherein said terminal plate and said fuse holder are arranged such that these fuse holders are so placed as to form an acute angle with respect to an axis of the terminal rod, and said fuse member is held by these fuse holders so as to be bent substantially into L-shape.

13. An electric cigar lighter as claimed in claim 9, wherein each fuse holder portion of the terminal plate and the fuse holder has a bent lug portion for clamping one end of said fuse.

14. An electric cigar lighter as claimed in claim 9, wherein said contact means is supported by a supporting means, to said tubular holder, and secured to said supporting means by a rivet, one of said fuse holders being secured together with said contact means to said supporting means by said rivet, with the other of said fuse holders being secured to said terminal rod means.

15. An electric cigar lighter for use in vehicles and the like comprising:
- a socket having a tubular holder;
- a movable igniting unit having a heating element which can be positioned in said tubular holder and manually moved to a closed-circuit position and automatically returned to an open-circuit position after said heating element carried by the unit has reached a predetermined temperature;

contact means in the interior of said tubular holder for detachable connection of said heating element to a source of power;

a terminal plate mounted on the exterior of said tubular holder for connection to a source of power;

a terminal rod means arranged to be inserted into an opening formed in a bottom wall of said tubular holder for securing said terminal plate;

a pair of fuse holders arranged in said tubular holder;

support means on said tubular holder for supporting said contact means including a rivet;

an elongated fuse member adapted to be incorporated in said closed-circuit, said fuse member further including a fuse and an electrically insulating tube for covering said fuse, said insulating tube having a melting point lower than that of said fuse, whereby said fuse member melts and separates into two parts upon overheating of said heating element, the separated ends of said fuse being wrapped by separated ends of said insulating tube, one of said fuse holders being secured together with said contact means to said supporting means by said rivet, with the other of said fuse holders being secured to said terminal rod means and each of said fuse holders having a fuse holder portion for holding one end of said fuse member.

* * * * *